United States Patent
Jin et al.

(10) Patent No.: US 9,536,492 B2
(45) Date of Patent: Jan. 3, 2017

(54) PIXEL STRUCTURE, DRIVING METHOD THEREOF AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Huijun Jin, Shanghai (CN); Song Ye, Shanghai (CN); Bo Liu, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 72 days.

(21) Appl. No.: 14/529,057

(22) Filed: Oct. 30, 2014

(65) Prior Publication Data

US 2016/0035305 A1  Feb. 4, 2016

(30) Foreign Application Priority Data

Aug. 4, 2014 (CN) .......................... 2014 1 0379870

(51) Int. Cl.
*G02F 1/1345* (2006.01)
*G02F 1/1362* (2006.01)
*G09G 3/36* (2006.01)
*G09G 3/34* (2006.01)
*G09G 3/00* (2006.01)

(52) U.S. Cl.
CPC .......... *G09G 3/3696* (2013.01); *G02F 1/13454* (2013.01); *G02F 1/136286* (2013.01); *G09G 3/006* (2013.01); *G09G 3/3406* (2013.01); *G09G 3/3637* (2013.01); *G09G 3/3648* (2013.01); *G09G 2300/0439* (2013.01); *G09G 2300/0447* (2013.01); *G09G 2310/0224* (2013.01);

(Continued)

(58) Field of Classification Search
CPC ........... G02F 1/13454; G02F 1/136286; G09G 2360/145; G09G 3/3696; G09G 2300/0439; G09G 3/3406

See application file for complete search history.

(56) References Cited

U.S. PATENT DOCUMENTS

| 2008/0079001 A1* | 4/2008 | Umezaki | ............. H01L 27/1214 257/59 |
| 2010/0259512 A1* | 10/2010 | Lin | ...................... G09G 3/3677 345/204 |

FOREIGN PATENT DOCUMENTS

| CN | 1716064 A | 1/2006 |
| CN | 101154342 A | 4/2008 |

(Continued)

Primary Examiner — Charles Hicks
(74) Attorney, Agent, or Firm — Anova Law Group, PLLC

(57) ABSTRACT

A pixel structure includes a plurality of data lines, a plurality of scan lines, a plurality of pixels located in an area defined by the data lines crossing the scan lines, a common voltage line connected with the plurality of pixels, a voltage detection unit connected with the data lines and configured to detect voltages on the data lines, and a voltage compensation unit connected with the data lines and configured to compensate voltages on the data lines so that brightness differences between different pixels corresponding to the plurality of scan lines is the lowest, so as to improve or eliminate effectively linear cloudy strips with uniform bright and dark strips and improve the image quality of a displayed image on a liquid crystal display panel.

19 Claims, 5 Drawing Sheets

(52) U.S. Cl.
CPC ... *G09G 2320/068* (2013.01); *G09G 2330/12* (2013.01); *G09G 2360/145* (2013.01)

(56) References Cited

FOREIGN PATENT DOCUMENTS

| | | |
|---|---|---|
| CN | 101739935 A | 6/2010 |
| CN | 103472642 A | 12/2013 |
| JP | 2000330094 A | 11/2000 |
| KR | 100731267 B1 | 6/2007 |
| TW | 201037440 A1 | 10/2010 |

\* cited by examiner

PIXEL STRUCTURE, DRIVING METHOD THEREOF AND DISPLAY DEVICE

CROSS-REFERENCES TO RELATED APPLICATIONS

This application claims priority to Chinese patent application No. 201410379870.4 filed on Aug. 4, 2014 and entitled "PIXEL STRUCTURE, DRIVING METHOD THEREOF AND DISPLAY DEVICE", the content of which is incorporated herein by reference in its entirety.

BACKGROUND OF THE INVENTION

An existing liquid crystal display includes pixel elements arranged in the form of a matrix and a driving circuit configured to drive these pixel elements, so that liquid crystal molecules are deflected by varying an electric field inside a liquid crystal box to thereby achieve a display effect.

In order to improve the display effect, the multi-domain display technology has been widely applied, wherein the existing multi-domain display is possible in a multi-domain pixel structure designed in a pixel or possible in a pseudo multi-domain pixel structure with different domain directions being designed in adjacent pixels in order to avoid the problem of a color irregularity arising from multiple domains being designed in a pixel.

FIG. 1A illustrates a schematic structural diagram of an existing pixel element, and FIG. 1B illustrates a schematic structural diagram of an existing pixel array. As illustrated in FIG. 1A, the pixel element in an existing pseudo dual-domain pixel structure includes a first pixel element 101 and a second pixel element 102, which are driven by different thin film transistors, wherein the inclined line direction A-A' and the inclined line direction B-B' as illustrated in the FIG. 1A represent domain inclination directions in the two adjacent pixel elements respectively, and then as can be apparent from FIG. 1A, the domain inclination directions in the two pixel elements are different, and the domain inclination direction in the same pixel element is uniform. With the structure of the pixel array in FIG. 1B composed of pixel elements as illustrated in FIG. 1A, the domain inclination direction in pixel elements in the same row direction is uniform, and domain inclination directions in two adjacent rows of pixel elements are different. For example, in FIG. 1B, first pixel elements 101 are arranged throughout a first row direction, second pixel elements 102 are arranged throughout a second row direction, first pixel elements 101 are arranged throughout a third row direction, and so on, the domain inclination directions in every two adjacent rows of pixel elements are different, so that the domain inclination directions of pixel elements at the interface between the adjacent rows are opposite, and when a picture is displayed, there are different display states in the adjacent rows, i.e., dark in one row and bright in the other row, which easily results in transversal strips at the interface between the two adjacent rows. Moreover if a polarization sheet is bonded askew, then polarization angles in odd-numbered rows and polarization angles in even-numbered rows are non-uniform and consequently scan lines in odd-numbered rows and even-numbered rows have uneven brightness, thus resulting in transversal strips.

BRIEF SUMMARY OF THE INVENTION

In view of this, the invention provides a pixel structure and a driving method thereof and a display device.

A pixel structure including: a plurality of data lines; a plurality of scan lines which cross the data lines; a plurality of pixels, each of which is located in an area formed by the data lines crossing corresponding scan lines; a common voltage line connected with the plurality of pixels; a voltage detection unit, connected with the data lines, and configured to detect voltages on the data lines; and a voltage compensation unit, connected with the data lines, configured to compensate voltages on the data lines.

Embodiments of the present invention provide a pixel driving method of a display panel, wherein the display panel includes a plurality of data lines, a plurality of scan lines, and a plurality of pixels located in an area formed by the data lines crossing the scan lines. The driving method including the steps of: providing a common voltage to drive each of the plurality of pixels; providing an initial data line voltage to drive each of the plurality of data lines; providing a voltage detection unit, which is connected respectively with the data lines and configured to detect voltages on the data lines; providing a voltage compensation unit to compensate voltages on the data lines; enabling sequentially odd-numbered rows of scan lines among the plurality of scan lines and detecting brightness of the pixels corresponding to the odd-numbered rows of scan lines; enabling sequentially even-numbered rows of scan lines among the plurality of scan lines and detecting brightness of the pixels corresponding to the even-numbered rows of scan lines; detecting brightness differences between the brightness of the pixels corresponding to the odd-numbered rows of scan lines and the brightness of the pixels corresponding to the even-numbered rows of scan lines; and compensating the initial data line voltages of the pixels corresponding to the odd-numbered rows of scan lines or initial data line voltages of the pixels corresponding to the even-numbered rows of scan lines according to the brightness differences so that the brightness differences are reduced.

Embodiments of the present invention also provide a display device including the pixel structure described above.

Compared with the prior art, the invention compensates the voltages on the data lines to thereby minimize the brightness differences between the different pixels corresponding to the plurality of scan liens, so as to improve or eliminate effectively linear cloudy strips with uniform bright and dark strips and improve the image quality of a displayed image on the liquid crystal display panel.

DETAILED DESCRIPTION OF THE INVENTION

In order to make the objects and features of the invention more apparent, particular embodiments of the invention will be further described below with reference to the drawings, but the invention can be embodied in different forms and shall not be construed as being limited to the embodiments described below.

Figure 1A:
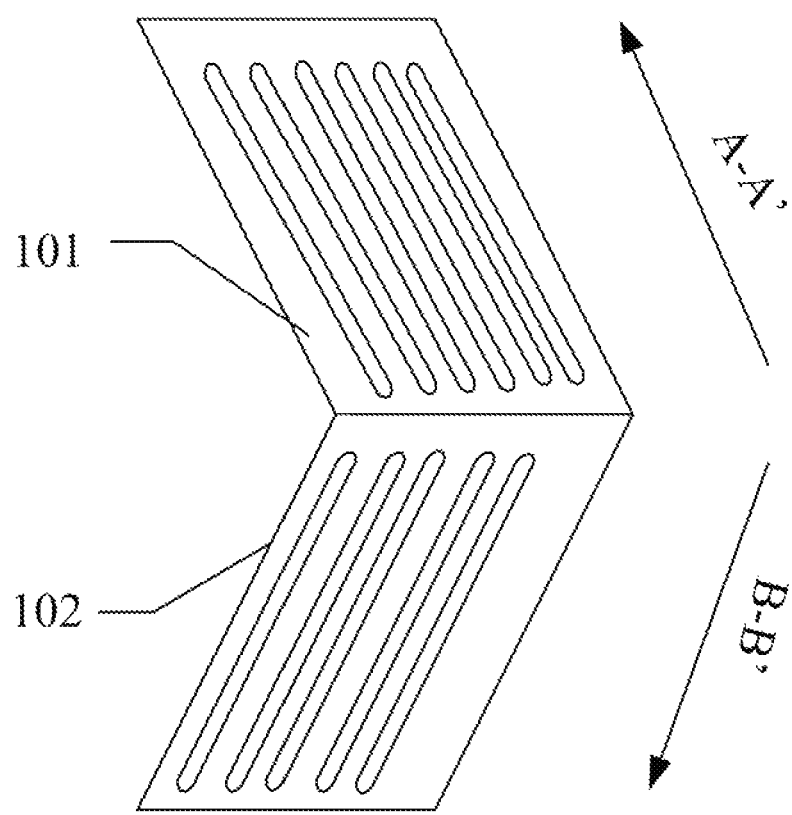
FIG. 1A illustrates a schematic diagram of an existing pixel element structure.
Figure 1B:
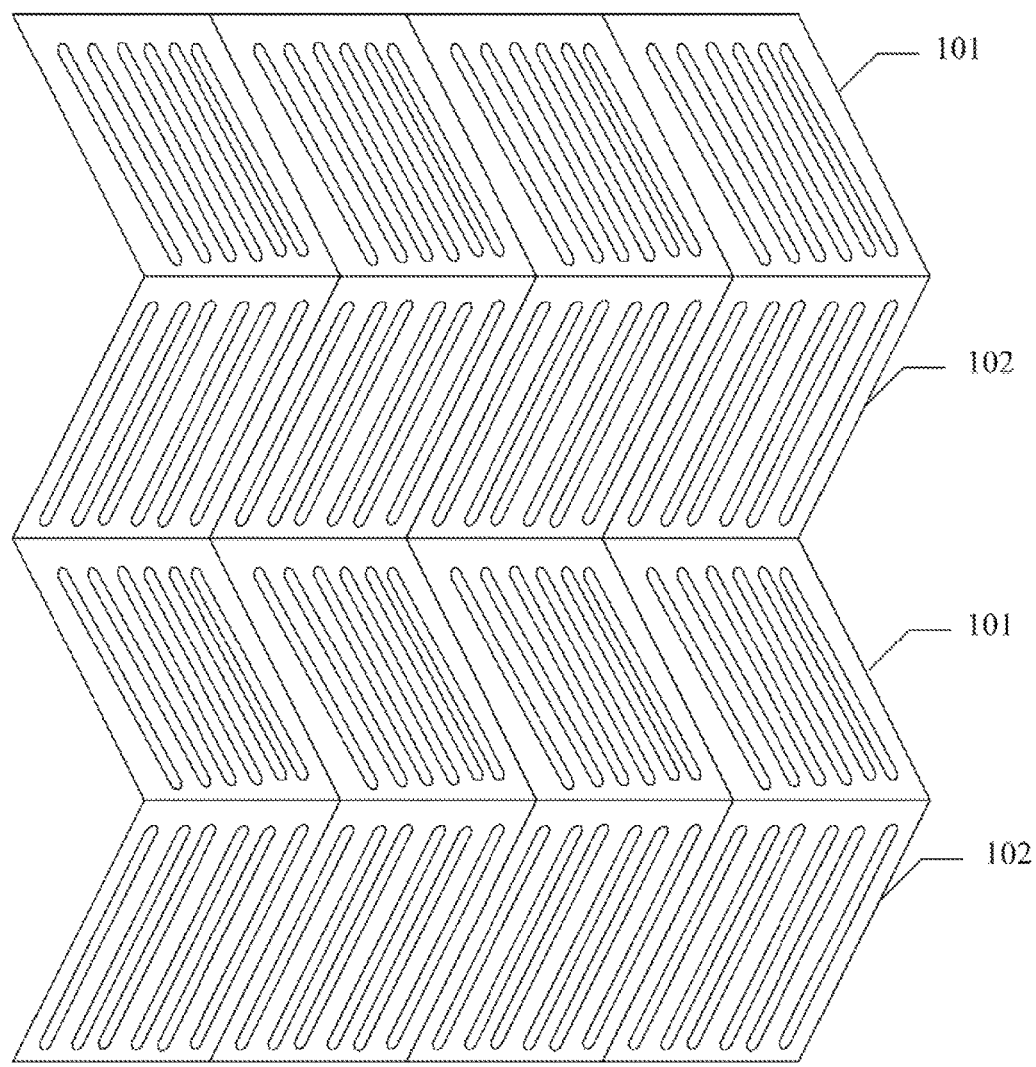
FIG. 1B illustrates a schematic structural diagram of an existing pixel array.
Figure 2:
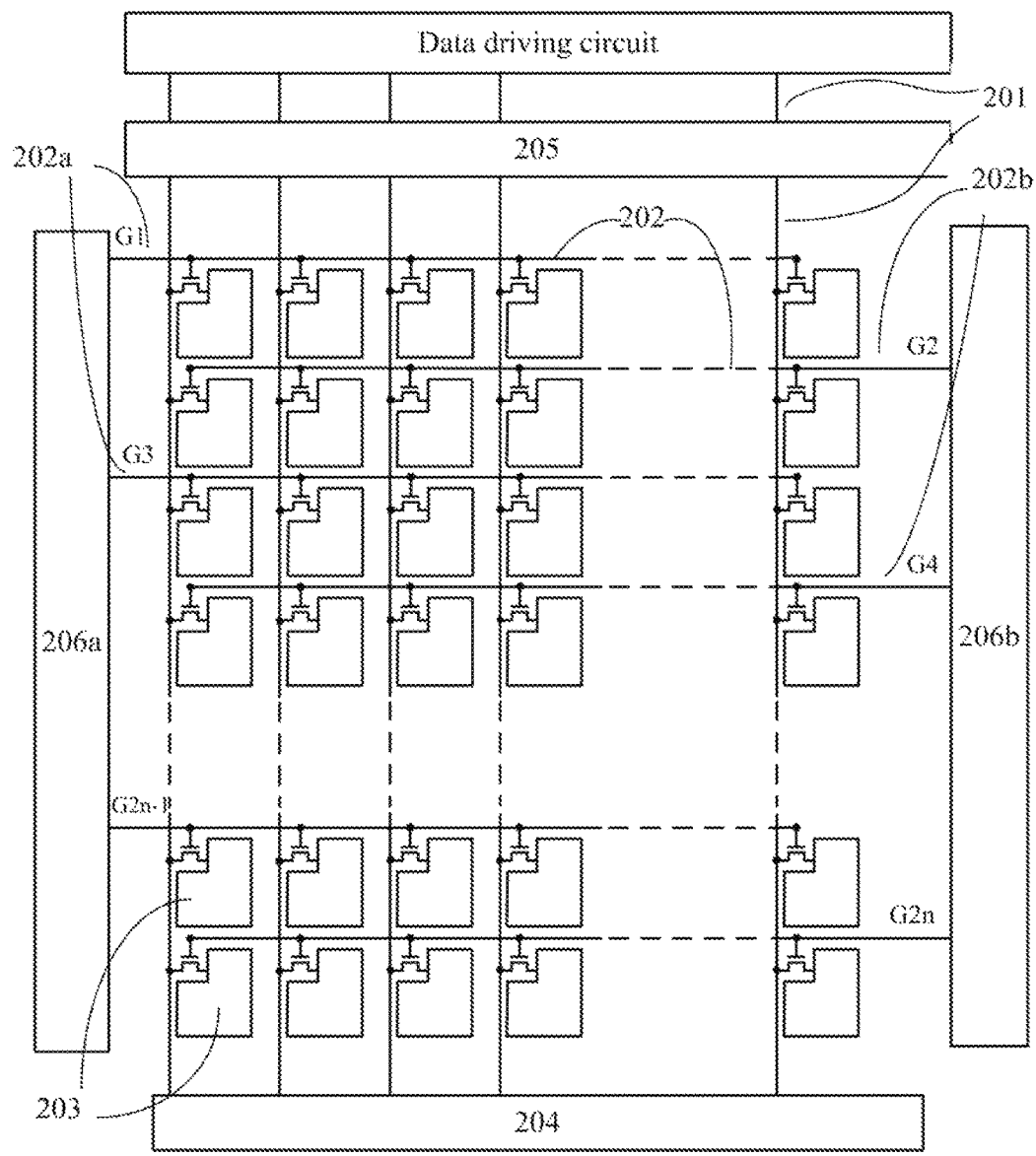
FIG. 2 illustrates a schematic structural diagram of a pixel structure according to an embodiment of the invention.

In order to better suppress the phenomenon of transversal strips in a picture being displayed in a dual-domain pixel structure, an embodiment of the invention provides a pixel structure. As illustrated in FIG. 2, a pixel structure according to the invention includes: a plurality of data lines 201; a plurality of scan lines 202 which cross the data lines 201; a plurality of pixels 203, each of which is located in an area formed by the data lines 201 crossing corresponding scan lines 202; a common voltage line (not illustrated) connected with the plurality of pixels 203; a voltage detection unit 204, connected with the data lines 201, configured to detect voltages on the data lines 201; and a voltage compensation unit 205, connected with the data lines 201, configured to compensate voltages on the data lines 201. The driving signals applied to respective pixels 203 are distributed in positive and negative symmetry with respect to the voltage of the common voltage line. The pixel structure further includes a first scan driver 206a and a second scan driver 206b, wherein the first scan driver 206a is configured to drive odd-numbered rows of scan lines 202a, and the second scan driver 206b is configured to drive even-numbered rows of scan lines 202b. In order to accommodate demands for different products, the first scan driver 206a and the second scan driver 206b can be located on a same side of a non-display area of a display panel, or the first scan driver 206a and the second scan driver 206b can be located on opposite sides of the non-display area of the display panel.

In the pixel structure in this embodiment, the voltage detection unit 204 measures the voltages of the corresponding pixels 203 to determine whether there is a brightness difference between the pixels 203 corresponding to the different scan lines 202 and further to determine whether there is a phenomenon of transversal strips when an image is being displayed, and then the voltage compensation unit 205 compensates the voltages of the data lines on the corresponding pixels 203 according to a measurement result by the voltage detection unit 204. If the voltages of the data lines of the pixels 203 corresponding to the different scan lines 202 in the dual-domain structure is uniform, then the phenomenon of transversal strips would not occur when an image is being displayed.

An embodiment of the invention further provides a display device including the pixel structure described above.

Figure 3:
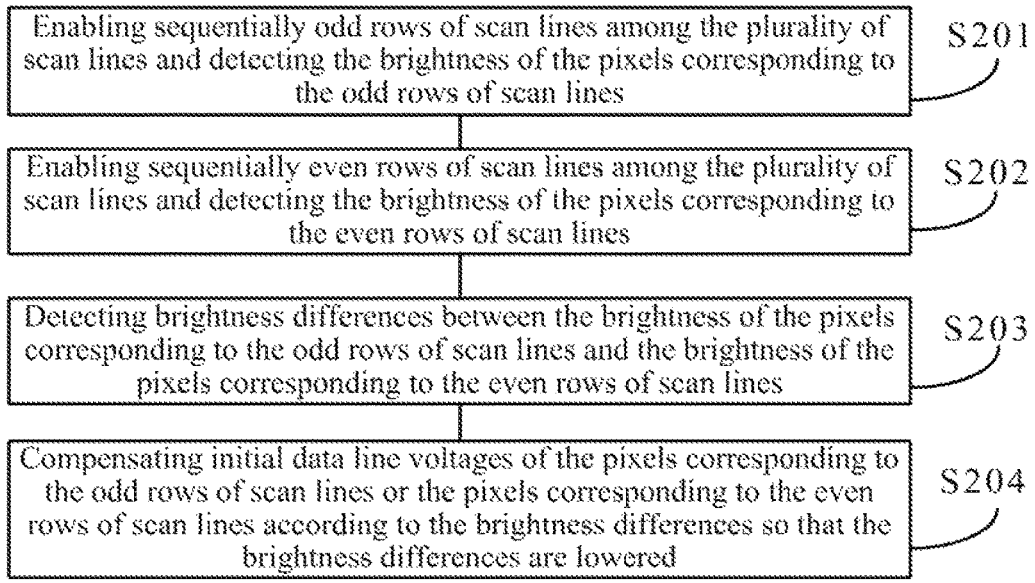
FIG. 3 illustrates a flow chart of a pixel driving method according to the embodiment of the invention.

In order to address the phenomenon of transversal strips occurring in a dual-domain structure in the prior art, as illustrated in FIG. 3, an embodiment of the invention provides a driving method for driving the pixel structure. The method includes the following sequential steps:

Step S201: sequentially enable odd-numbered rows of scan lines among the plurality of scan lines and detect the brightness of the pixels corresponding to the odd-numbered rows of scan lines.

Step S202: sequentially enable even-numbered rows of scan lines among the plurality of scan lines and detect the brightness of the pixels corresponding to the even-numbered rows of scan lines.

Wherein the steps S201 and S202 can be performed in a reversed order or can be performed simultaneously to shorten a required time for drive.

Step S203: detect the brightness differences between the brightness of the pixels corresponding to the odd-numbered rows of scan lines and the brightness of the pixels corresponding to the even-numbered rows of scan lines.

The brightness differences are determined from the total brightness of the pixels corresponding to the odd-numbered rows of scan lines and the even-numbered rows of scan lines, and since the brightness difference of pixels corresponds to scan lines at different locations, the corresponding brightness difference can be determined from the location of the scan line.

Step S204: compensate the initial data line voltages of the pixels corresponding to the odd-numbered rows of scan lines or the pixels corresponding to the even-numbered rows of scan lines according to the brightness differences so that the brightness differences are reduced.

The brightness differences can be lowered by compensating the voltage of the data lines corresponding to the pixels 203 to thereby avoid non-uniform polarization angles in the odd-numbered rows and the even-numbered rows, due to poor bonding of a polarization sheet in the dual-domain structure, without modifying the dual-domain structure. Particularly the voltage compensation unit 205 compensates the desired voltages of the data lines according to the initial data line voltages corresponding to the pixels 203 detected by the voltage detection unit 204.

In the present embodiment, a compensation scheme may include but is not limited to:

A first scheme for maintaining the initial data line voltages of the pixels 203 corresponding to the odd-numbered rows of scan lines 202a, and compensating the initial data line voltages of the pixels 203 corresponding to the even-numbered rows of scan lines 202b so that the compensated voltages of the data lines of the even-numbered rows of scan lines 202b are equal to the initial data line voltages of the pixels 203 corresponding to the odd-numbered rows of scan lines 202a. This compensation scheme will not take into account whether the luminescent brightness of the pixels 203 corresponding to the odd-numbered rows of scan lines 202a is higher or lower than the luminescent brightness of the pixels 203 corresponding to the even-numbered rows of scan lines 202b, but only require that the voltages of the data lines of the pixels 203 corresponding to the even-numbered rows of scan lines 202b are compensated to be equal to the initial data line voltages of the pixels 203 corresponding to the odd-numbered rows of scan lines 202a.

A second scheme for maintaining the initial data line voltages of the pixels 203 corresponding to the even-numbered rows of scan lines 202b, and compensating the initial data line voltages of the pixels 203 corresponding to the odd-numbered rows of scan lines 202a so that the compensated voltages of the data lines of the odd-numbered rows of scan lines 202a are equal to the initial data line voltages of the pixels 203 corresponding to the even-numbered rows of scan lines 202b.

A third scheme for simultaneously compensating the initial data line voltages of the pixels 203 corresponding to both the odd-numbered rows of scan lines 202a and the even-numbered rows of scan lines 202b so that the compensated voltages of the data lines of the pixels 203 corresponding to the odd-numbered rows of scan lines 202a are equal to the compensated voltages of the data lines of the pixels 203 corresponding to the even-numbered rows of scan lines 202b.

In order for the optimum voltages of the data lines, a first one of the plurality of data lines 202 is enabled, and the brightness of a first pixel corresponding to the first scan line is detected; a second scan line adjacent to the first scan line is enabled, and the brightness of a second pixel corresponding to the second scan line is detected; and the voltage of the data line corresponding to the first pixel or the voltage of the data line corresponding to the second pixel is compensated so that the brightness difference between the first pixel and the second pixel is the lowest. Due to the lowest brightness difference between the adjacent first pixel and second pixel, the compensation scheme of the initial data line voltage is optimized to thereby avoid transversal strips from occurring.

In another embodiment of the invention, in view of the brightness difference of the dual-domain structure as viewed by a user of the liquid crystal panel is varied when the user is at a different location, the technical solution according to the embodiment can compensate the voltages of the data lines dynamically to ensure that the viewer viewing the liquid crystal panel at a different location will not see the phenomenon of transversal strips.

Figure 4:
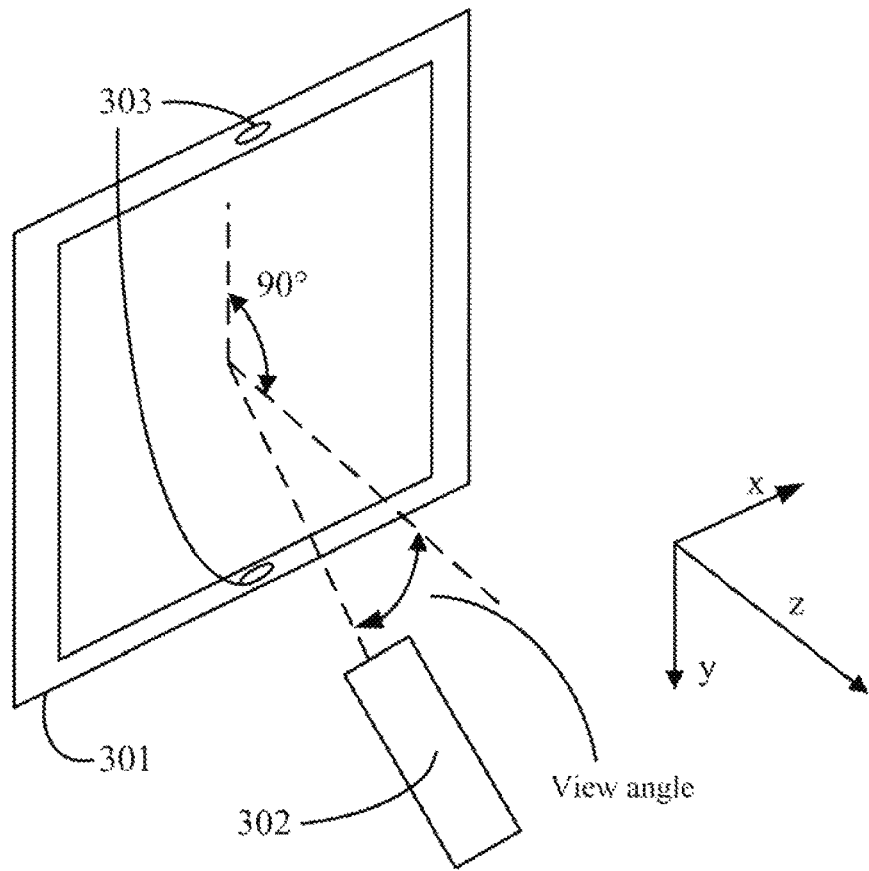
FIG. 4 illustrates a schematic structural diagram of a pixel structure according to another embodiment of the invention.

The present embodiment is different from the embodiment described above in connection with FIG. 2 in that a brightness detection device 302 and an image detection device 303 are further provided. As illustrated in FIG. 4, the brightness detection device 302 is located directly in front of the display panel 301 including the pixel structure and is configured to view a picture being displayed on the display panel 301; and the image detection devices 303 is located on one side of a non-display area of the display panel 301 are configured to obtain the central position and the view angle of the brightness detection device 302, wherein the number of image detection devices 303 is preferably at least two, or the image detection devices 303 are arranged on all four sides of the non-display area of the display panel 301, and a larger number of image detection devices 303 together with their different distribution of locations can better obtain the central position and the view angle of the brightness detection device 302.

Figure 5:
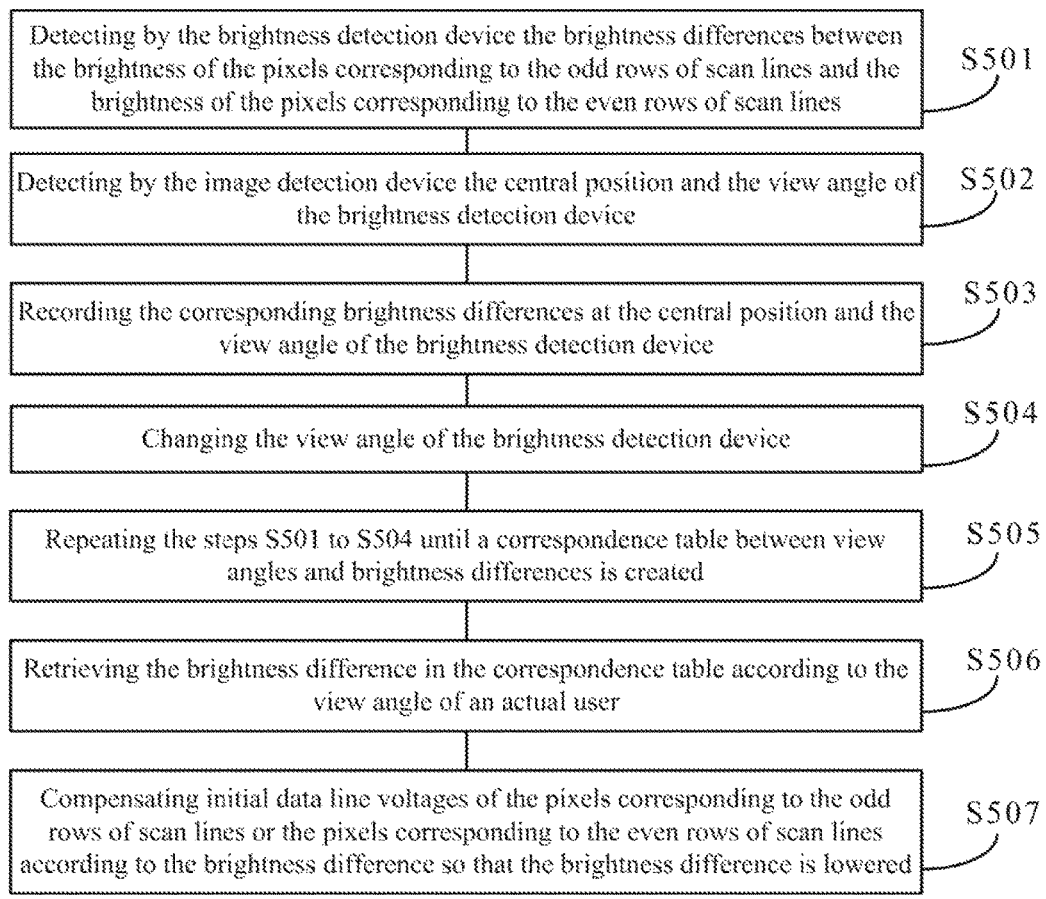
FIG. 5 illustrates a flow chart of a pixel driving method according to another embodiment of the invention.

The embodiment further provides a driving method of the pixel structure, as illustrated in FIG. 5, the method includes the following sequential steps:

Step S501: detect, by the brightness detection device, the brightness differences between the brightness of the pixels corresponding to the odd-numbered rows of scan lines and the brightness of the pixels corresponding to the even-numbered rows of scan lines.

Step S502: obtain, by the image detection device, a central position and a view angle of the brightness detection device.

The view angle is the angle between the brightness detection device aimed at the center of the display panel 301 and the normal at the center of the display panel 301.

Step S503: record the corresponding brightness differences at the central position and the view angle of the brightness detection device.

Step S504: change the view angle of the brightness detection device.

Step S505: repeat the steps S501 to S504 until a correspondence table between view angles and brightness differences is created.

In the correspondence table between view angles and brightness differences, an one-to-one relationship between the view angles and the brightness differences is stored, and since the brightness difference varies dependent upon the view angle and independent of the detection distance, a different brightness difference can be obtained simply by changing the view angle.

The view angle is changed at a time preferably by a variation amount of 2.2° to 4.7° to ensure that the detection cost can be lowered as a result of a lower number of changes and also the correspondence table between view angles and brightness differences can be derived precisely. Finally the correspondence table is burned (stored) into a storage device built in the image detection device and the brightness difference can be retrieved automatically in use.

Step S506: retrieve the brightness difference in the correspondence table according to the view angle of an actual user.

When the actual user of the display panel is watching an image displayed on the display panel 301, the image detection device 303 locates actively the center of both eyes of the user and obtains the view angle of the user. The view angle is detected by the image detection device 303 focusing the left eye and the right eye of the user respectively and obtaining the focus distances, so that if the focus distance of the left eye and the focus distance of the right eye are equal when the user is being faced to the center of the display panel 301, then the image detection device 303 determines the view angle of the user to be 0° and retrieves the brightness difference corresponding to 0° in the correspondence table. If the focus distance of the left eye and the focus distance of the right eye are unequal when the user is not being faced to the center of the display panel 301, then the image detection device 303 can obtain the view angle of the user.

Step S507: compensate the initial data line voltage of the pixels corresponding to the odd-numbered rows of scan lines or the pixels corresponding to the even-numbered rows of scan lines according to the brightness difference so that the brightness difference is reduced.

Since the actual user may change the view angle, at which the user watches an image displayed on the display panel 301, at any time, the image detection device 303 can detect the view angle of the user in a period of time, preferably at an interval of time ranging from 16.67 ms to 43.2 ms, to thereby compensate dynamically the voltage of the data lines corresponding to the pixels so as to ensure that the user can experience the optimum view effect.

The invention has been described by taking the dual-domain structure as an example, and a single-domain or multi-domain pixel structure and a corresponding pixel driving method thereof also fall into the scope of the invention as defined in the claims.

Evidently those skilled in the art can make various modifications and variations to the invention without departing from the spirit and scope of the invention. Thus the invention is also intended to encompass these modifications and variations thereto so long as the modifications and variations come into the scope of the appended claims and their equivalents.

What is claimed is:

1. A pixel structure, comprising:
    a plurality of data lines, wherein each of the plurality of data lines has a first end and a second end opposite to the first end;
    a plurality of scan lines;
    a plurality of pixels located in an area defined by the data lines crossing the scan lines;
    a common voltage line connected with the plurality of pixels;
    a voltage detection unit directly connected with the first ends of the data lines and configured to detect voltages on the data lines; and
    a voltage compensation unit directly connected with the second ends of the data lines and configured to compensate voltages on the data lines.

2. The pixel structure according to claim 1, further comprising:
    a first scan driver configured to drive odd-numbered rows of the scan lines; and a second scan driver configured to drive even-numbered rows of the scan lines.

3. The pixel structure according to claim 2, wherein the first scan driver and the second scan driver are located on a same side of a non-display area of a display panel.

4. The pixel structure according to claim 2, wherein:
the first scan driver is located on a left side of a non-display area of a display panel; and
the second scan driver is located on a right side of the non-display area of the display panel.

5. The pixel structure according to claim 1, further comprising:
a brightness detection device arranged in front of a display panel and configured to view an image being displayed on the display panel; and
an image detection device arranged in a non-display area of the display panel, and configured to obtain a central position and a view angle of the brightness detection device.

6. The pixel structure according to claim 1, wherein the pixel structure is a dual-domain structure.

7. A driving method for driving a display panel comprising a plurality of data lines, a plurality of scan lines arranged in odd-numbered and even-numbered rows, a plurality of pixels located in an area defined by the data lines crossing the scan lines, and each of the plurality of data lines has a first end and a second end opposite to the first end, the driving method comprising the steps of:
providing a common voltage to drive each of the pixels;
providing an initial data line voltage to drive each of the data lines;
providing a voltage detection unit directly connected with the first ends of the data lines and configured to detect voltages on the data lines;
providing a voltage compensation unit directly connected with the second ends of the data lines and configured to compensate the voltages on the data lines;
enabling the odd-numbered rows of scan lines among the plurality of scan lines and detecting brightness of the pixels corresponding to the odd-numbered rows of scan lines;
enabling the even-numbered rows of scan lines among the plurality of scan lines and detecting brightness of the pixels corresponding to the even-numbered rows of scan lines;
detecting brightness differences between the brightness of the pixels corresponding to the odd-numbered rows of scan lines and the brightness of the pixels corresponding to the even-numbered rows of scan lines; and
compensating initial data line voltages of the pixels corresponding to the odd-numbered rows of scan lines or initial data line voltages of the pixels corresponding to the even-numbered rows of scan lines according to the brightness differences.

8. The driving method according to claim 7, further comprising:
enabling a first data line of the plurality of data lines, and detecting brightness of a first pixel corresponding to a first scan line;
enabling a second scan line adjacent to the first scan line, and detecting brightness of a second pixel corresponding to the second scan line; and
adjusting the voltage of the data line corresponding to the first pixel or the second pixel so that a brightness difference between the first pixel and the second pixel is the lowest.

9. The driving method according to claim 7, wherein the step of compensating comprises:
maintaining the initial data line voltages of the pixels corresponding to the odd-numbered rows of scan lines, and compensating the initial data line voltages of the pixels corresponding to the even-numbered rows of scan lines.

10. The driving method according to claim 9, wherein the compensated voltages of the data lines of the pixels corresponding to the even-numbered rows of scan lines are equal to the voltages of the data lines of the pixels corresponding to the odd-numbered rows of scan lines.

11. The drive method according to claim 7, wherein the step of compensating comprises:
maintaining the initial data line voltages of the pixels corresponding to the even-numbered rows of scan lines, and compensating the initial data line voltages of the pixels corresponding to the odd-numbered rows of scan lines.

12. The driving method according to claim 11, wherein the compensated voltages of the data lines of the pixels corresponding to the odd-numbered rows of scan lines are equal to the voltages of the data lines of the pixels corresponding to the even-numbered rows of scan lines.

13. The driving method according to claim 7, further comprising:
(a) detecting, by a brightness detection device, the brightness differences between the brightness of the pixels corresponding to the odd-numbered rows of scan lines and the brightness of the pixels corresponding to the even-numbered rows of scan lines;
(b) obtaining, by an image detection device, a central position and a view angle of the brightness detection device;
(c) recording corresponding brightness differences at the central position and the view angle of the brightness detection device;
(d) changing the view angle of the brightness detection device;
(e) repeating the steps (a) to (d) to create a correspondence table between view angles and brightness differences;
(f) retrieving a brightness difference in the correspondence table in response to a view angle of a user; and
(g) compensating initial data line voltages of the pixels corresponding to the odd-numbered rows of scan lines or the pixels corresponding to the even-numbered rows of scan lines according to the brightness difference so that the brightness difference is reduced.

14. A display device comprising a pixel structure, wherein the pixel structure comprises:
a plurality of data lines, wherein each of the plurality of data lines has a first end and a second end opposite to the first end;
a plurality of scan lines;
a plurality of pixels located in an area defined by the data lines crossing the scan lines;
a common voltage line connected with the plurality of pixels;
a voltage detection unit directly connected with the first ends of the data lines and configured to detect voltages on the data lines; and
a voltage compensation unit directly connected with the second ends of the data lines and configured to compensate voltages on the data lines.

15. The display device according to claim 14, wherein the pixel structure further comprises:

a first scan driver configured to drive odd-numbered rows of the scan lines; and a second scan driver configured to drive even-numbered rows of the scan lines.

16. The display device according to claim 15, wherein the first scan driver and the second scan driver are located on a same side of a non-display area of a display panel.

17. The display device according to claim 15, wherein:

the first scan driver is located on a left side of a non-display area of a display panel; and the second scan driver is located on a right side of the non-display area of the display panel.

18. The display device according to claim 14, wherein the pixel structure further comprises:

a brightness detection device arranged in front of a display panel and configured to view a picture being displayed on the display panel; and an image detection device arranged in a non-display area of the display panel and configured to obtain a central position and a view angle of the brightness detection device.

19. The display device according to claim 14, wherein the pixel structure is a dual-domain structure.

* * * * *